US011386284B2

(12) United States Patent
Alcock et al.

(10) Patent No.: US 11,386,284 B2
(45) Date of Patent: Jul. 12, 2022

(54) SYSTEM AND METHOD FOR IMPROVING SPEED OF SIMILARITY BASED SEARCHES

(71) Applicant: Avigilon Corporation, Vancouver (CA)

(72) Inventors: Nicholas John Alcock, Vancouver (CA); Dharanish Kedarisetti, Somerville, MA (US); Peter L. Venetianer, McLean, VA (US)

(73) Assignee: AVIGILON CORPORATION, Vancouver (CA)

( * ) Notice: Subject to any disclaimer, the term of this patent is extended or adjusted under 35 U.S.C. 154(b) by 344 days.

(21) Appl. No.: 16/568,012

(22) Filed: Sep. 11, 2019

(65) Prior Publication Data

US 2020/0082212 A1 Mar. 12, 2020

Related U.S. Application Data

(60) Provisional application No. 62/730,215, filed on Sep. 12, 2018.

(51) Int. Cl.
*G06V 30/00* (2022.01)
*G06K 9/62* (2022.01)
(Continued)

(52) U.S. Cl.
CPC ........... *G06K 9/6215* (2013.01); *G06F 16/56* (2019.01); *G06F 16/784* (2019.01); *G06K 9/622* (2013.01);
(Continued)

(58) Field of Classification Search
CPC .... G06K 9/6215; G06K 9/00268; G06K 9/46; G06K 9/622; G06K 9/6407;
(Continued)

(56) References Cited

U.S. PATENT DOCUMENTS 5,647,058 A * 7/1997 Agrawal ............... G06K 9/6232
6,084,595 A * 7/2000 Bach .................... G06F 16/5838
345/589
(Continued)

FOREIGN PATENT DOCUMENTS

CN 101859326 A 10/2010
EP 1089198 A2 4/2001
(Continued)

OTHER PUBLICATIONS

The International Search Report and the Written Opinion, corresponding patent application No. PCT/CA2019/051289, filed Sep. 11, 2019, all pages.
(Continued)

*Primary Examiner* — Amir Alavi
(74) *Attorney, Agent, or Firm* — Daniel Hammond (57) ABSTRACT

A method and system for processing images for a search is provided, including: receiving a plurality of images selected from search results; for each image in the plurality of images, retrieving a feature vector associated with the image; selecting a subset of the feature vectors based on similarity of feature vectors associated with the images in the plurality of images; and performing a search for feature vectors in a database similar to the feature vectors in the subset of feature vectors.

19 Claims, 8 Drawing Sheets

(51) Int. Cl.
  *G06F 16/783* (2019.01)
  *G06N 20/00* (2019.01)
  *G06F 16/56* (2019.01)
  *G06V 10/40* (2022.01)
  *G06V 40/16* (2022.01)
(52) U.S. Cl.
  CPC ............. *G06N 20/00* (2019.01); *G06V 10/40* (2022.01); *G06V 40/168* (2022.01)
(58) Field of Classification Search
  CPC .. G06K 9/2009; G06K 9/6423; G06K 9/6476; G06K 9/00084; G06F 16/784; G06F 16/56; G06F 17/30249; G06T 7/001
  See application file for complete search history.

(56) References Cited

U.S. PATENT DOCUMENTS

| | | | |
|---|---|---|---|
| 7,043,474 B2* | 5/2006 | Mojsilovic | G06K 9/6215 |
| 10,459,995 B2* | 10/2019 | Lev-Tov | G06F 16/5854 |
| 10,614,124 B2* | 4/2020 | Chechik | G06F 16/78 |
| 10,740,619 B2* | 8/2020 | Massoudifar | G06N 20/00 |
| 10,747,989 B2* | 8/2020 | Zou | G06K 9/00268 |
| 10,949,467 B2* | 3/2021 | Lu | G06K 9/6232 |
| 11,055,349 B2* | 7/2021 | Remis | G06K 9/6217 |
| 2014/0105505 A1 | 4/2014 | Ioffe et al. | |
| 2015/0052139 A1 | 2/2015 | Cevahir et al. | |
| 2015/0080695 A1* | 3/2015 | Rogers | A61F 2/72 600/378 |
| 2016/0196350 A1 | 7/2016 | Mau | |
| 2018/0101742 A1 | 4/2018 | Burge et al. | |
| 2019/0117978 A1* | 4/2019 | Arcot Desai | A61N 1/0534 |
| 2020/0082212 A1* | 3/2020 | Alcock | G06F 16/58 |

FOREIGN PATENT DOCUMENTS

| | | |
|---|---|---|
| WO | 2015017304 A1 | 2/2015 |
| WO | 2016059576 A1 | 4/2016 |

OTHER PUBLICATIONS

The European Search Report—corresponding patent application No. 19861134.5, filed: Sep. 11, 2019, all pages.

* cited by examiner

SYSTEM AND METHOD FOR IMPROVING SPEED OF SIMILARITY BASED SEARCHES

RELATED APPLICATIONS

This application claims the benefit of U.S. Provisional Patent Application No. 62/730,215, filed on Sep. 12, 2018, which is hereby incorporated by reference in its entirety.

FIELD

The present subject-matter relates to identifying same individuals or objects appearing in a plurality of different video recordings and, in particular, to allowing a user to provide input into a computer terminal of a surveillance system in order to identify individuals or objects appearing in video recordings.

BACKGROUND

Intelligent processing and playback of recorded video is an important functionality to have in camera surveillance systems. The playback of recorded video may be useful to review and identify objects or persons of interest found in the video captured by the cameras. This may then be used for some security-related purpose or purpose such as, for example, locating the object or person of interest.

However, camera surveillance systems may have a large number of cameras that are each generating their own respective video feed. This may make review of these feeds during playback cumbersome, time consuming and expensive.

SUMMARY

The embodiments described herein provide in one aspect, a method of processing images for a search, including: receiving a plurality of images selected from search results; for each image in the plurality of images, retrieving a respective feature vector associated therewith; selecting a subset of the feature vectors based on similarity of the feature vectors; and performing a search for feature vectors in a database similar to feature vectors in the subset of feature vectors.

The received plurality of images are selected based on similarity to a reference image, were generated from a search for images similar to a reference image, and are selected by a user.

Selecting the subset of feature vectors includes clustering the feature vectors associated with the images into a plurality of clusters, filtering the feature vectors based on k-mediod clustering, and selecting a feature vector from each of the clusters. The selected feature vector from each of the clusters includes selecting a feature vector in a cluster associated with an image showing the face of a person.

According to some example embodiments, a method of processing images for a search is provided, including: conducting a search for images similar to a reference image; receiving a plurality of images selected from search results; for each image in the plurality of images, retrieving a respective feature vector associated therewith; selecting a subset of the feature vectors based on similarity of the feature vectors; locating feature vectors in a database similar to feature vectors in the subset of feature vectors; and displaying images associated with the located feature vectors.

The embodiments described herein provide in another aspect, a computer implemented method of processing images for a search is provided, including: receiving a plurality of images selected from search results; for each image in the plurality of images, retrieving a respective feature vector associated therewith; selecting a subset of the feature vectors based on similarity of the feature vectors; and performing a search for feature vectors in a database similar to feature vectors in the subset of feature vectors.

The embodiments described herein provide in another aspect, a non-transitory computer-readable storage medium, having stored thereon instructions, that when executed by a processor, cause the processor to perform a method for processing images for a search is provided, including: receiving a plurality of images selected from search results; for each image in the plurality of images, retrieving a respective feature vector associated therewith; selecting a subset of the feature vectors based on similarity of the feature vectors; and performing a search for feature vectors in a database similar to feature vectors in the subset of feature vectors.

The embodiments described herein provide in another aspect, a search system including: cameras for capturing videos of scenes, the videos having images of objects; a processor with a learning machine for generating feature vectors from images of the objects associated with the videos and for generating a first feature vector from a first image of an object of interest; a network for sending the images of the objects from the cameras to the processor; and a storage system for storing the generated feature vectors of the images and the associated videos; wherein the processor further compares the feature vectors from the images with the first feature vector to generate similarity scores, and further prepares the images of the objects with higher similarity scores for presentation to a user at a display; the processor receives a plurality of images from the display for a search; and if the number of images in the plurality of images exceeds a threshold, filters the plurality of images to a second plurality of images, the number of images in the second plurality of images less than the number of images in the first plurality of images; and the processor further compares the feature vectors associated with each image in the second plurality of images to feature vectors in the storage system and prepares the images associated with feature vectors in the storage system with confidence levels greater than a threshold for display.

BRIEF DESCRIPTION OF THE DRAWINGS

The detailed description refers to the following figures, in which.

It will be appreciated that for simplicity and clarity of illustrates, elements shown in the figures have not necessarily been drawn to scale. For example, the dimensions of some of the elements may be exaggerated relative to other elements for clarity. Furthermore, where considered appropriate, reference numerals may be repeated among the figures to indicate corresponding or analogous elements.

DETAILED DESCRIPTION OF VARIOUS EMBODIMENTS

Numerous specific details are set forth in order to provide a thorough understanding of the exemplary embodiments described herein. However, it will be understood by those of ordinary skill in the art that the described embodiments may be practiced without these specific details. In other instances, well-known methods, procedures and components have not been described in detail so as not to obscure the described embodiments. Furthermore, this description is not to be considered as limiting the scope of the described embodiments in any way but rather as merely describing the implementation of the various embodiments.

The word "a" or "an" when used in conjunction with the term "comprising" or "including" in the claims and/or the specification may mean "one", but it is also consistent with the meaning of "one or more", "at least one", and "one or more than one" unless the content clearly dictates otherwise. Similarly, the word "another" may mean at least a second or more unless the content clearly dictates otherwise.

The terms "coupled", "coupling" or "connected" as used herein can have several different meanings depending in the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through one or more intermediate elements or devices via an electrical element, electrical signal or a mechanical element depending on the particular context.

The word "video" herein refers to data produced by a video capture device and that represents images captured by the video capture device. The image may include a plurality of sequential image frames, which together form a video captured by the video capture device. Each image frame may be represented by a matrix of pixels, each pixel having a pixel image value. For example, the pixel image value may be a numerical value on grayscale (e.g. 0 to 255) or a plurality of numerical values for colored images. Examples of color spaces used to represent pixel image values in image data include RGB, YUV, CYKM, YCBCR 4:2:2, YCBCR 4:2:0 images. Video includes video files and video segments with associated metadata that have indications of time and of which camera when there are more than one camera.

The term "metadata" or variants thereof herein refers to information obtained by computer-implemented analysis of images including images in video. For example, processing video may include, but is not limited to, image processing operations, analyzing, managing, compressing, encoding, storing, transmitting and/or playing back the video data. Analyzing the video may include segmenting areas of image frames and detecting visual objects, tracking and/or classifying visual objects located within the captured scene represented by the image data. The processing of the image data may also cause additional information regarding the image data or visual objects captured within the images to be output. For example, such additional information is commonly understood as metadata. The metadata may also be used for further processing of the image data, such as forming bounding boxes around detected objects in image frames.

As will be appreciated by one skilled in the art, the various example embodiments described herein may be embodied as a method, system, or computer program product. Accordingly, the various example embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, the various example embodiments may take the form of a computer program product on a computer-usable storage medium having computer-usable program code embodied in the medium Any suitable computer-usable or computer readable medium may be utilized. The computer-usable or computer-readable medium may be, for example but not limited to, an electronic, magnetic, optical, electromagnetic, infrared, or semiconductor system, apparatus, device, or propagation medium. In the context of this document, a computer-usable or computer-readable medium may be any medium that can contain, store, communicate, propagate, or transport the program for use by or in connection with the instruction execution system, apparatus, or device.

Computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or entirely on the remote computer or server. In the latter scenario, the remote computer may be connected to the computer through a local area network (LAN) or a wide area network (WAN), or the connection may be made to an external computer (for example, through the Internet using an Internet Service Provider).

Various example embodiments are described below with reference to flowchart illustrations and/or block diagrams or flow diagrams of methods, apparatus (systems) and computer program products according to embodiments of the invention. It will be understood that each block of the flowchart and/or illustrations and/or block or flow diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram or flow diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram or flow diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram or flow diagram block or blocks.

Figure 1:
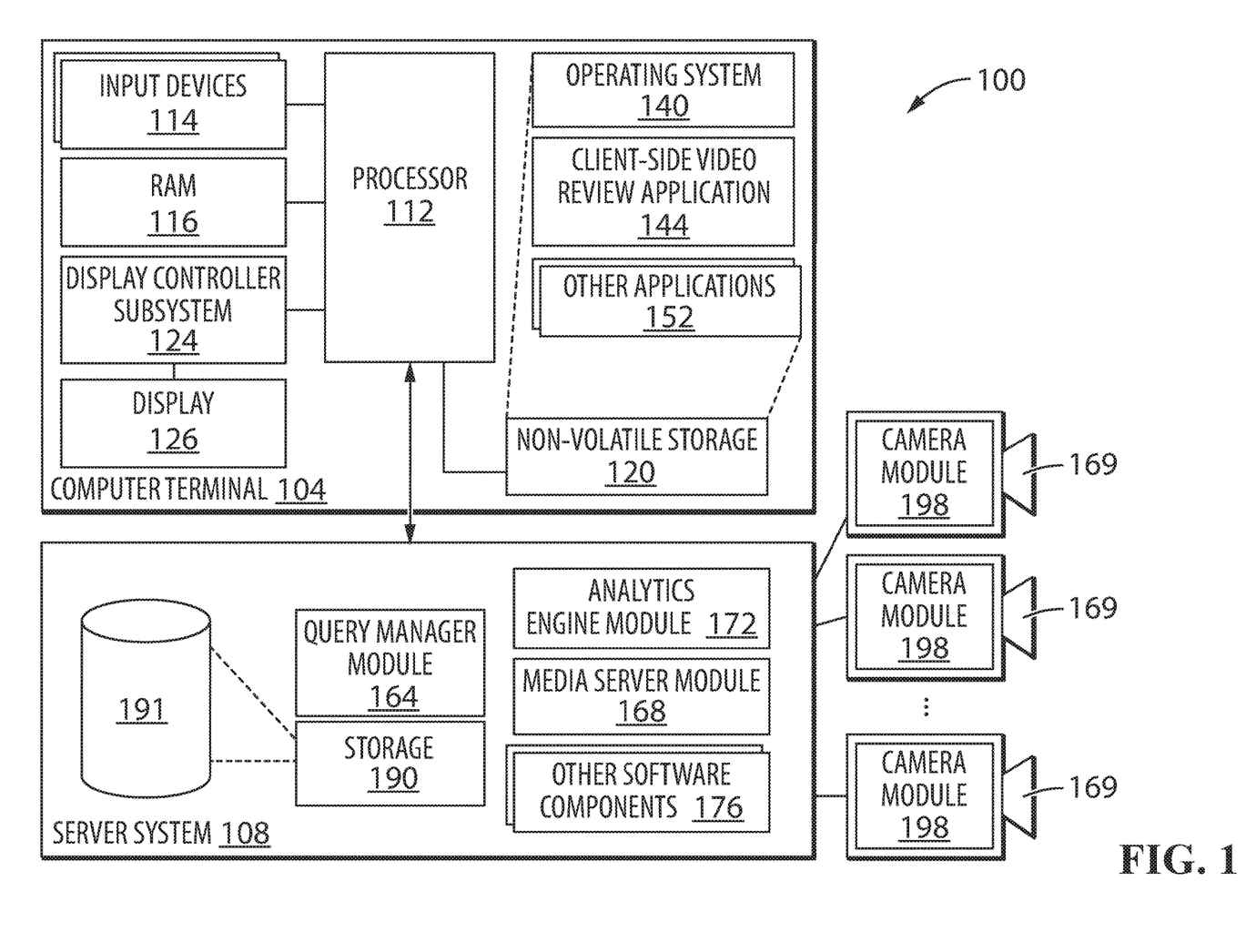
FIG. 1 shows a block diagram of an example surveillance system within which methods in accordance with example embodiments can be carried out.

Reference is now made to FIG. 1 which shows a block diagram of an example surveillance system 100 within which methods in accordance with example embodiments can be carried out. Included within the illustrated surveillance system 100 are one or more computer terminals 104 and a server system 108. In some example embodiments, the computer terminal 104 is a personal computer system; however in other example embodiments the computer terminal 104 is a selected one or more of the following: a handheld device such as, for example, a tablet, a phablet, a smart phone or a personal digital assistant (PDA); a laptop computer; a workstation, a smart television; and other suitable devices. With respect to the server system 108, this could comprise a single physical machine or multiple physical machines, such as network video recorders (NVRs). It will be understood that the server system 108 need not be contained within a single chassis, nor necessarily will there be a single location for the server system 108. As will be appreciated by those skilled in the art, at least some of the functionality of the server system 108 can be implemented within the computer terminal 104 or camera 169 rather than within the server system 108.

The computer terminal 104 communicates with the server system 108 through one or more networks. These networks can include the Internet, or one or more other public/private networks coupled together by network switches or other communication elements. The network(s) could be of the form of, for example, client-server networks, peer-to-peer networks, etc. Data connections between the computer terminal 104 and the server system 108 can be any number of known arrangements for accessing a data communications network, such as, for example, dial-up Serial Line Interface Protocol/Point-to-Point Protocol (SLIP/PPP), Integrated Services Digital Network (ISDN), dedicated lease line service, broadband (e.g. cable) access, Digital Subscriber Line (DSL), Asynchronous Transfer Mode (ATM), Frame Relay, or other known access techniques (for example, radio frequency (RF) links). In at least one example embodiment, the computer terminal 104 and the server system 108 are within the same Local Area Network (LAN).

The computer terminal 104 includes at least one processor 112 that controls the overall operation of the computer terminal. The processor 112 interacts with various subsystems such as, for example, input devices 114 (such as a selected one or more of a keyboard, mouse, touch pad, touch screen, roller ball and voice control means, for example), random access memory (RAM) 116, non-volatile storage 120, display controller subsystem 124 and other subsystems [not shown]. The display controller subsystem 124 interacts with display 126 and renders graphics and/or text upon the display 126.

Still with reference to the computer terminal 104 of the surveillance system 100, operating system 140 and various software applications used by the processor 112 are stored in the non-volatile storage 120. The non-volatile storage 120 is, for example, one or more hard disks, solid state drives, or some other suitable form of computer readable medium that retains recorded information after the computer terminal 104 is turned off. Regarding the operating system 140, this includes software that manages computer hardware and software resources of the computer terminal 104 and provides common services for computer programs. Also, those skilled in the art will appreciate that the operating system 140, client-side video review application 144, and other applications 152, or parts thereof, may be temporarily loaded into volatile storage such as the RAM 116. The processor 112, in addition to its operating system functions, can enable execution of the various software applications on the computer terminal 104.

Figure 2:
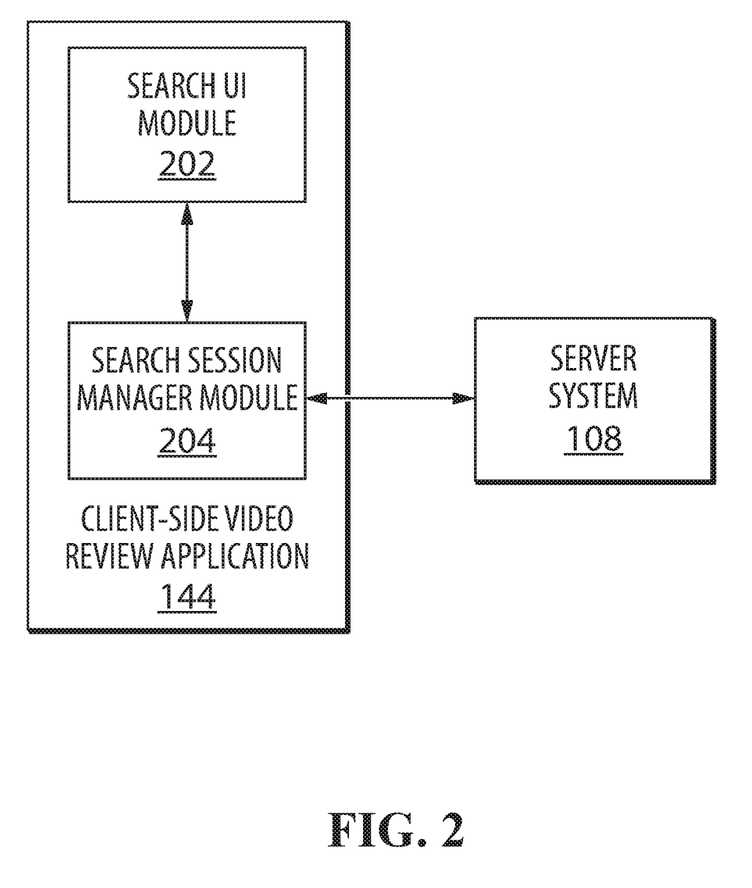
FIG. 2 shows a block diagram of a set of operational modules of the video capture and playback system according to one example embodiment.

More details of the video review application 144 are shown in the block diagram of FIG. 2. The video review application 144 can be run on the computer terminal 104 and includes a search User Interface (UI) module 202 for cooperation with a search session manager module 204 in order to enable a computer terminal user to carry out actions related to providing input and, more specifically, input to facilitate identifying same individuals or objects appearing in a plurality of different video recordings. In such circumstances, the user of the computer terminal 104 is provided with a user interface generated on the display 126 through which the user inputs and receives information in relation to the video recordings.

Besides the query manager module 164, the server system 108 includes several software components for carrying out other functions of the server system 108. For example, the server system 108 includes a media server module 168. The media server module 168 handles client requests related to storage and retrieval of video taken by video cameras 169 in the surveillance system 100. The server system 108 also includes an analytics engine module 172. The analytics engine module 172 can, in some examples, be any suitable one of known commercially available software that carry out mathematical calculations (and other operations) to attempt computerized matching of same individuals or objects as between different portions of video recordings (or as between any reference image and video compared to the reference image). For example, the analytics engine module 172 can, in one specific example, be a software component of the Avigilon Control Center™ server software sold by Avigilon Corporation. In some examples the analytics engine module 172 uses descriptive characteristics of the person's or object's appearance. Examples of these characteristics include the person's or object's shape, size, textures and color.

The server system 108 also includes a number of other software components 176. These other software components will vary depending on the requirements of the server system 108 within the overall system. As just one example, the other software components 176 might include special test and debugging software, or software to facilitate version updating of modules within the server system 108 or updating of firmware of cameras 169. The server system 108 also includes one or more data stores 190. In some examples, the data store 190 comprises one or more databases 191 which facilitate the organized storing of recorded video.

Regarding the video cameras 169, each of these includes a camera module 198. In some examples, the camera module 198 includes one or more specialized chips to facilitate processing and encoding of video before it is even received by the server system 108. For instance, the specialized chip may be a System-on-Chip (SoC) solution including both an encoder and a Central Processing Unit (CPU), and may also include a graphics processing unit (GPU) or video processing unit (VPU), which may include a neural computing engine, such as an Intel@ Movidius™ Myriad™ VPU. These permit the camera module 198 to carry out the processing and encoding functions, including video analytics functions. Also, in some examples, part of the processing functions of the camera module 198 includes creating metadata for recorded video. For instance, metadata may be generated relating to one or more foreground areas that the camera module 198 has detected, and the metadata may define the location and reference coordinates of the foreground visual object within the image frame. For example, the location metadata may be further used to generate a bounding box, typically rectangular in shape, outlining the detected foreground visual object. The image within the bounding box may be extracted for inclusion in metadata. The extracted image may alternately be smaller then what was in the bounding box or may be larger then what was in the bounding box. The size of the image being extracted can also be close to, but outside of, the actual boundaries of a detected object.

In some examples, the camera module 198 includes a number of submodules for video analytics such as, for instance, an object detection submodule, an instantaneous object classification submodule, a temporal object classification submodule and an object tracking submodule. Regarding the object detection submodule, such a submodule can be provided for detecting objects appearing in the field of view of the camera 169. The object detection submodule may employ any of various object detection methods understood by those skilled in the art such as, for example, motion detection and/or blob detection. In another exemplary embodiment, the submodules for video analytics can be included in the server system 108.

Regarding the object tracking submodule that may form part of the camera module 198, this may be operatively coupled to both the object detection submodule and the temporal object classification submodule. The object tracking submodule would be included for the purpose of temporally associating instances of an object detected by the object detection submodule. The object tracking submodule may also generate metadata corresponding to visual objects it tracks.

Regarding the instantaneous object classification submodule that may form part of the camera module 198, this may be operatively coupled to the object detection submodule and employed to determine a visual object type (such as, for example, human, vehicle or animal) based upon a single instance of the object. The input to the instantaneous object classification submodule may optionally be a sub-region of an image in which the visual object of interest is located rather than the entire image frame. The instantaneous object classification submodule may use a neural network on the VPU.

Regarding the temporal object classification submodule that may form part of the camera module 198, this may be operatively coupled to the instantaneous object classification submodule and employed to maintain classification information of an object over a period of time. The temporal object classification submodule may average the instantaneous classification information of an object provided by the instantaneous classification submodule over a period of time during the lifetime of the object. In other words, the temporal object classification submodule may determine a type of an object based on its appearance in multiple frames. For example, gait analysis of the way a person walks can be useful to classify a person, or analysis of the legs of a person can be useful to classify a cyclist. The temporal object classification submodule may combine information regarding the trajectory of an object (e.g. whether the trajectory is smooth or chaotic, whether the object is moving or motionless) and confidence of the classifications made by the instantaneous object classification submodule averaged over multiple frames. For example, determined classification confidence values may be adjusted based on the smoothness of trajectory of the object. The temporal object classification submodule may assign an object to an unknown class until the visual object is classified by the instantaneous object classification submodule a sufficient number of times and a predetermined number of statistics has been gathered. In classifying an object, the temporal object classification submodule may also take into account how long the object has been in the field of view. The temporal object classification submodule may make a final determination about the class of an object based on the information described above. The temporal object classification submodule may also use a hysteresis approach for changing the class of an object. More specifically, a threshold may be set for transitioning the classification of an object from unknown to a definite class, and that threshold may be larger than a threshold for the opposite transition (for example, from a human to unknown). The temporal object classification submodule may aggregate the classifications made by the instantaneous object classification submodule.

In some examples, the camera module 198 is able to detect objects, such as humans and extract images of objects, e.g. humans, with respective bounding boxes outlining the human objects for inclusion in metadata which along with the associated video may transmitted to the server system 108. At the system 108, the media server module 168 can process extracted images and generate signatures (also referred to as "feature vectors") to represent objects. In computer vision, a feature extractor (also known as a "feature generator") is generally known as an algorithm that takes an image and outputs feature descriptions or feature vectors. Feature extractors encode information, i.e. an image, into a series of numbers to act as a numerical "fingerprint" that can be used to differentiate one image from another. Ideally this information is invariant under image transformation so that the features may be found again in another image of the same object. Examples of feature extractor algorithms are SIFT (Scale-invariant feature transform), HOG (histogram of oriented gradients), and SURF (Speeded Up Robust Features). A learning machine, such as a convolutional neural network (CNN) may be trained to generate feature vectors. Alternatively, or in addition, a VPU on camera module 198, may generate signatures, such as feature vectors, for transmission to media server module 168.

A feature vector is an n-dimensional vector of numerical features (numbers) that represent an image of an object that can be processed by computers. By comparing the feature vector of one image of one object with the feature vector of another image, a computer implementable process may determine whether the one image and the another image are images of the same object within a specified confidence level. The feature vectors (or image signatures, or embedding, or representation, etc.) are vectors calculated by (for example convolutional) neural networks.

Similarity calculation can be determined, for example, by calculating the Euclidean distance, as explained below, between two feature vectors of two images captured by one or more of the cameras 169. Alternative, a learning machine, such as a neural network may be used to perform the similarity calculation. Thus a computer implementable process can determine a similarity score to indicate similarity of the two images.

In accordance with at least some examples, storage of feature vectors within the surveillance system 100 is contemplated. For instance, feature vectors may be indexed and stored in the database 191 with respective video. The feature vectors may also be associated with reference coordinates to where extracted images of respective objects are located in respective video. Storing may include storing video with, for example, time stamps, camera identifications, metadata with the feature vectors and reference coordinates, etc.

Figure 3:
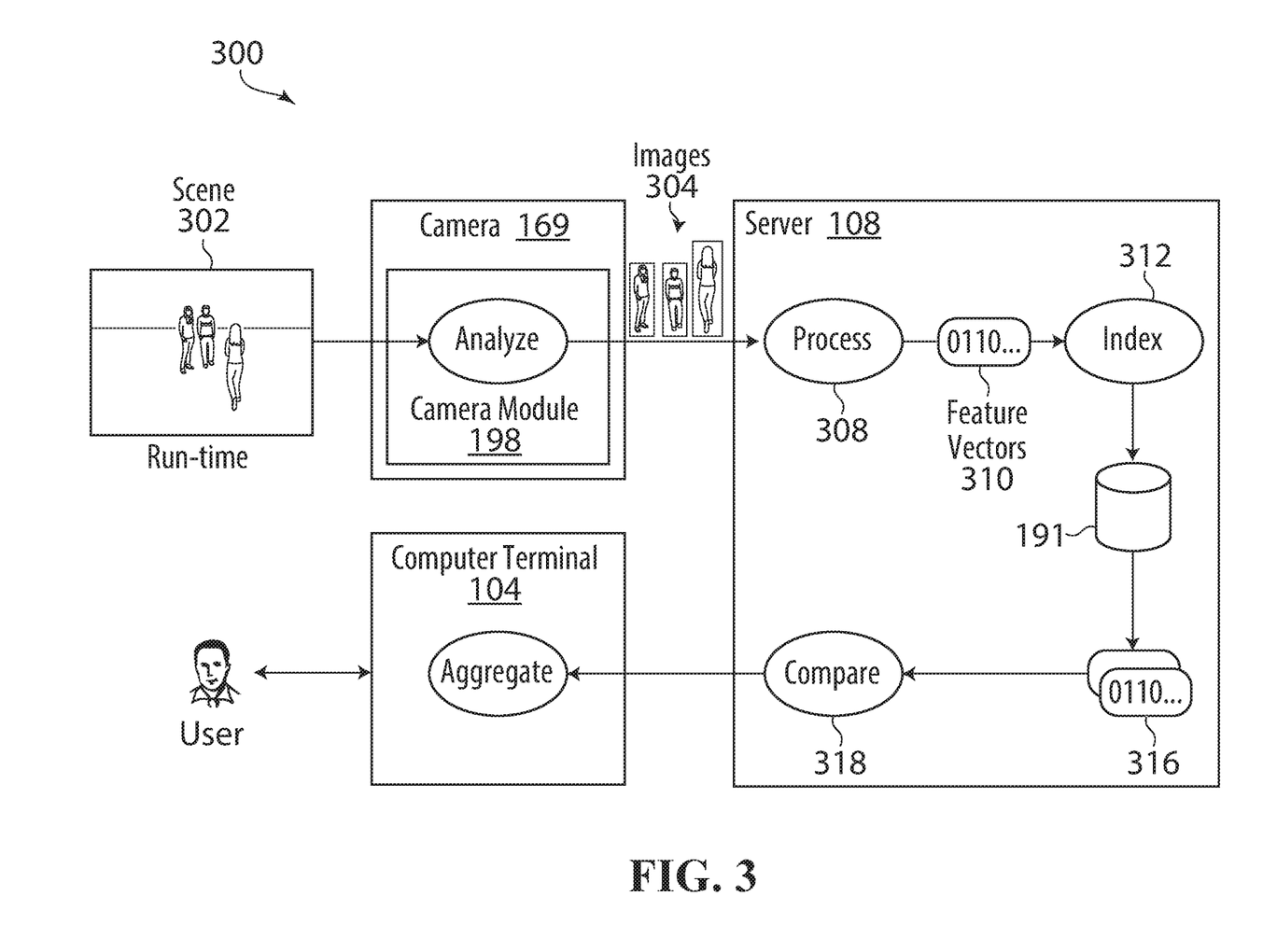
FIG. 3 shows a flow diagram of an example embodiment of a method for performing appearance matching to locate an object of interest on one or more image frames of a video captured by a camera module.

Referring now to FIG. 3, therein illustrated is a flow diagram of an example embodiment of a method 300 for performing appearance searching to locate an object of interest on one or more image frames of a video captured by one or more camera modules 169. The video is captured by the one or more cameras 169 over a period of time. The time could be over hours or over months and could be spread over several video files or segments. The processing of the video is separated into multiple stages and distributed to optimize resource utilization and indexing for subsequent searching of objects (or persons) of interest. The video where such persons of interest are found in the search may then be reviewed by users.

Video of scene 302 is captured by the camera 169. The scene 302 is within the field of view of the camera 169. The video is processed by camera module 198, to produce metadata with images 304 of objects. The camera module 198 does the object detection and classification, but also generates images (also known as "chips") from the video that best represent the objects in the scene 302. In this example, the images 304 of the objects, classified as people or humans, are extracted from the video and included in the metadata as images 304 for further identification processing. The video, including the metadata with the images 304, is sent over a network to the server system 108.

In an exemplary embodiment, at the server system 108, there is significantly more resources to further Process 308 the images 304 and generate feature vectors 310 to represent the objects in the scene 302. The Process 308 is, for example, a feature extractor. In an alternative exemplary embodiment, feature vectors may be generated at camera 169, and before metadata is produced.

By calculating the Euclidean distance between the two feature vectors of two images captured by the camera 169, a computer implementable process can determine a similarity score to indicate similarity of the two images. Neural networks may be trained in such manner that the feature vectors they compute for images are close (low Euclidian distance) for similar images and far (high Euclidian distance) for dissimilar images. In order to retrieve relevant images, the feature vector of the query image (also referred to as a "reference image") is compared with the feature vectors of the images in the database 191. The search results may be shown by ascending order of their distance (value between 0 and 1) to the query image. The similarity score may, for example, be a percentage as converted from the distance.

In this example implementation, the Process 308 uses a learning machine to process the images 304 to generate the feature vectors or signatures 310 of the images 304 of the objects captured in the video. The learning machine is for example a neural network such as a CNN running on a GPU or VPU. The CNN may be trained using training datasets containing millions of pairs of similar and dissimilar images. The CNN, for example, is a Siamese network architecture trained with a contrastive loss function to train the neural networks. An example of a Siamese network may be described in Bromley, Jane, et al. "Signature verification using a "Siamese" time delay neural network." International Journal of Pattern Recognition and Artificial Intelligence 7.04 (1993): 669-688.

The Process 308 deploys a trained model in what is known as batch learning where all of the training is done before it is used in the appearance search system. The trained model, in this embodiment, is a convolutional neural network learning model with one possible set of parameters. There is an infinity of possible sets of parameters for a given learning model. Optimization methods (such as stochastic gradient descent), and numerical gradient computation methods (such as Backpropagation) are used to find the set of parameters that minimize the objective function (AKA loss function). Contrastive loss function is used as the objective function. This function is defined such that it takes high values when the current trained model is less accurate (assigns high distance to similar pairs, or low distance to dissimilar pairs), and low values when the current trained model is more accurate (assigns low distance to similar pairs, and high distance to dissimilar pairs). The training process is thus reduced to a minimization problem. The process of finding the most accurate model is the training process and the resulting model with the set of parameters is the trained model and the set of parameters is not changed once it is deployed onto the appearance search system.

An alternate embodiment for Process 308 is to deploy a learning machine using what is known as online machine learning algorithms. The learning machine would be deployed in Process 308 with an initial set of parameters, however, the appearance search system will keep updating the parameters of the model based on some source of information (for example, user feedback in the selection of the images of the objects of interest). Such learning machines also include neural networks as well as convolutional neural networks.

The images 304 of human objects are processed by the Process 308 to generate feature vectors 310. The feature vectors 310 are Indexed 312 and stored in a database 191 with the video. The feature vectors 310 are also associated with reference coordinates to indicate where the images 304 of the object associated with the feature vector may be located in the video. The database 191 storage includes storing the video with time stamps and camera identification as well as the associated metadata with the feature vectors 310 of the images 304 and reference coordinates.

To locate a particular person in the video, a feature vector of the reference image, representing the person of interest, is generated. Feature vectors 316 which are similar to the feature vector of the reference image are extracted 316 from the database 191. The extracted feature vectors 316 are Compared 318 to the feature vector of the reference image and those extracted images associated with an extracted feature vector 316 exceeding to a threshold similarity score are provided to the computer terminal 104 for presentation to a user. The computer terminal 104 also has display 126 for the user to view the video and images associated with the extracted feature vectors 316.

In greater detail, the trained model is trained with a pre-defined distance function used to compare the computed feature vectors. The same distance function is used when the trained model is deployed in the appearance search system. The distance function is the Euclidian distance between the feature vectors where the feature vectors are normalized to have unit norms, and thus all feature vectors lie on a unit-norm hypersphere. After computing and storing the feature vectors of the detected objects in the database, searching similar objects is done using an exact nearest neighbor search which exhaustively evaluates the distance from the queried feature vector (feature vector of the reference image of the object of interest) to all other vectors in the time frame of interest. The search results are returned ranked by descending order of their distance to the queried feature vector.

In an alternate embodiment, an approximate nearest neighbor search may be used. It is similar to its 'exact' counterpart, but it retrieves the most likely similar results without looking at all results. This is faster, but may introduce false negatives. An example of approximate nearest neighbor may use an indexing of a hashing of the feature vectors. An approximate nearest neighbor search may be faster where the number of feature vectors is large such as when the search time frames are large.

Figure 4:
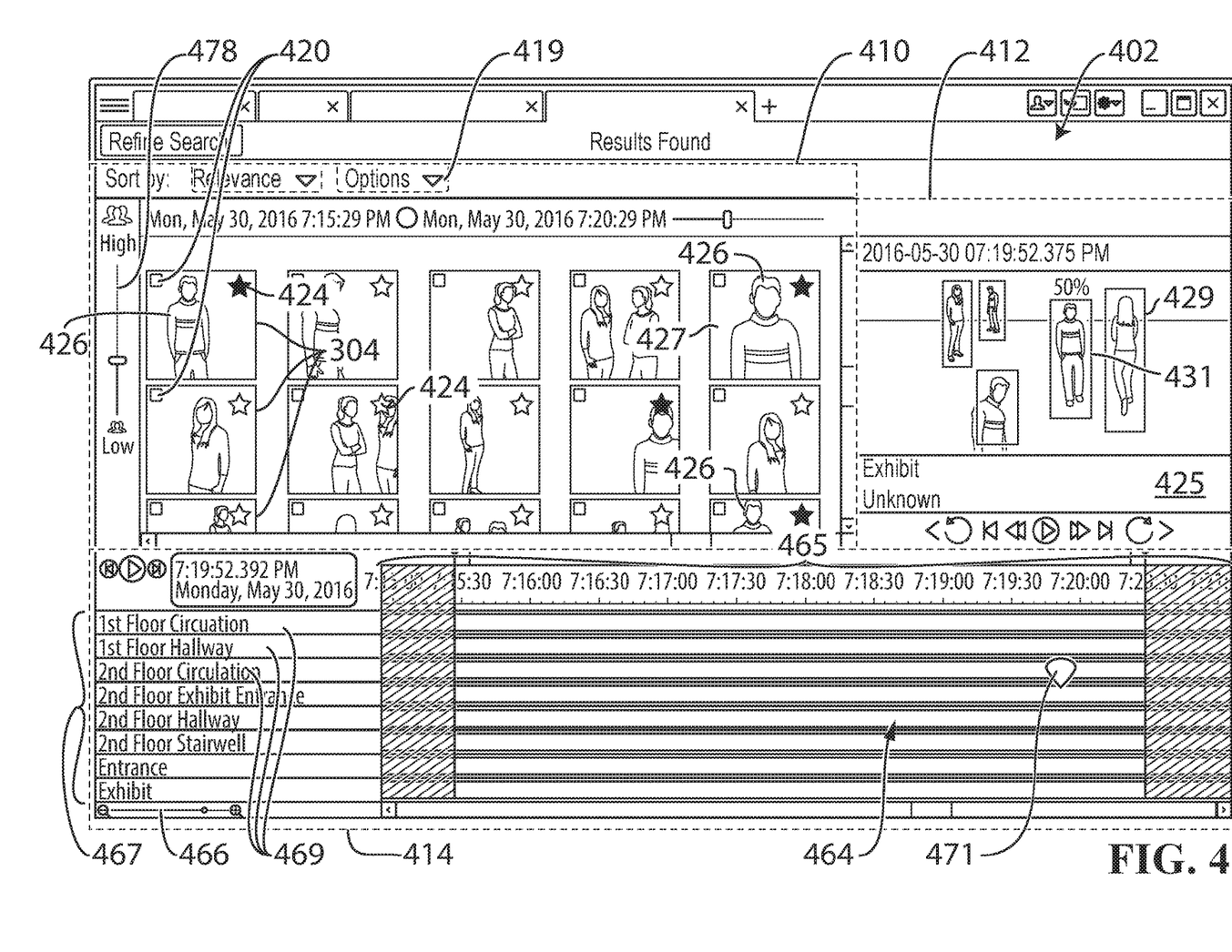
FIG. 4 shows an example embodiment of a graphical user interface displaying the results of an appearance search.

Reference will now be made to FIG. 4 which is a screen shot of an example user interface page 402, which can be interacted with for searching for same objects in video in accordance with an example embodiment. The user interface page 402 is divided into three functional regions: a first UI region 410, a second UI region 412 and a third UI region 414. Within the first UI region 410, slider tool 478 allows a user to set a filtering threshold based on the similarity score, also referred to as a "confidence level", so as to set a minimum confidence level for images which appear on the user interface page 402. Each of the images 304 displayed on the user interface page 402 are organized into rows and columns based on the confidence level, so that those images with the greatest confidence level will appear closer to the top left of the first UI region 410 than those corresponding to lower likelihood of a match. The drop-down selector 419 is labelled "Options" and allows the computer terminal user, once clicked on, to pick other search-related options such as, for example, initiate an export of all checked results or bookmark all the checked results. As will be appreciated by those skilled in the art, "export" in the context of recorded video means to move or copy video recording(s) or parts of video recording(s) from one device to another device (for example, for the purpose of backing up or otherwise saving what is being moved or copied). "Bookmark" means to create an electronic marker or index to make it easier for the computer terminal user to return to specific part(s) of video recording(s).

Each of the images 304 includes a square graphic 420 in the upper left corner of the thumbnail, and a star graphic 424 in the upper right corner of the thumbnail. These graphics are superimposed over the images 304. The square graphic 420 can be checked to indicate the corresponding image 304 should be, for example, bookmarked or exported. The star graphic 424 can be clicked on to select an image as indicating that the object or person of interest, or someone or something similar to the object or person of interest) is contained in the selected image 426. When this occurs (also herein referred to as "starring" a result) the star graphic 424 may change from a light, translucent shading to a solid bright color (although in the illustrated example color is not shown, the star graphic on the upper left of the selected images 426 has been clicked on to indicate a match whereas the other images 304 are not).

A video player 425 is included in the second UI region 412 within the user interface page 402. In the illustrated example, the video player 425 is playing the portion of the video recording corresponding to image 427. In this manner the computer terminal user can watch the portion of the video recording and hopefully by watching this the computer terminal user can see or notice something that will allow a decision to be made as to whether or not the individual or object of interest actually appears in the portion of the video recording corresponding to the image 427. In the illustrated example, bounding boxes, such as bounding boxes 429 and 431, appear around a number of moving objects and persons within the displayed video. The bounding box 431 has the percentage "50%" shown just above the top of the bounding box to indicate to the computer terminal user that the person within the bounding box 431 is calculated to have a 50% likelihood of being the person of interest. By contrast, the bounding box 429 does not have any percentage shown above it. In some examples, whether a percentage is or is not shown will depend upon whether a likelihood of appearance threshold is exceeded (i.e. the likelihood of appearance information will only appear if it is sufficiently high).

Within the third UI region 414 is a two dimensional graph 464. The two dimensional graph 464 includes date and time along x-axis 465. In the illustrated example, each thirty second interval is labelled starting at 7:15 PM at the far left of the x-axis and ending at 7:21 PM at the far right of the x-axis. In at least some examples, the interval of time between the two ends of the x-axis can be increased or decreased using a slider tool 466.

The two dimensional graph 464 also includes, along a y-axis of the graph 464, a listing 467 of a plurality of camera identifications 469 of video cameras with respect of which a respective plurality of video recordings of the video cameras are available for viewing. Each one of the plurality of camera identifications 469 corresponds to a respective one of the plurality of video cameras 169 that is located in a unique known physical location with respect to all locations of the plurality of video cameras 169 of the surveillance system 100. The organization of the listing 467 of the plurality of camera identifications 469 may be such that it is in descending order (from top to bottom) based on the number of images displayed generated by that camera 169. Alternatively other forms of organization of the listing 467 of the plurality of camera identifications 469 are contemplated. In at least one alternative example, the listing 467 of the plurality of camera identifications 469 can be made shorter by only showing those cameras having at least one starred result.

Still with reference to the third UI region 414, there is a marker 471 plotted at roughly 7:15.30 PM. In this illustrated example, the marker 471 corresponds to the thumbnail in the top left corner of the first UI region 410 which, as mentioned, has been starred as a match for the object or person of interest. To make the correspondence between the marker 471 and the corresponding thumbnail more apparent, the marker can be displayed in a same color as the star graphic on the thumbnail.

After selection of one or more images by clicking on the star graphic 424, a computer terminal user can click on the "Refine Search" button which causes system 100 to conduct a further search using the selected images 426. The system 100 thus can take the user's feedback to refine the search results (by merging the result of multiple reference images). In such examples the user interface 402 can allow for collecting the feedback of the user for the purpose of collecting data that can be used to refine the learning engine (or to train a new learning engine). This feedback mechanism can be used to create a system 100 that evolves by continuously and automatically learning from users.

Thus, an updated search is run when selected by the computer terminal 104 user. Alternatively, the computer terminal 104 user may be able to select a different learning engine (such as a different neural network) to run the search should this be desired. As will be appreciated by those skilled in the art, different search results will be produced whenever a different engine is used to run a search. Thus, in some examples it is possible to allow the computer terminal 104 user to try running a search on different engines until the user has decided upon a suitable engine. Thus, the computer terminal 104 user may be able to select between different learning engines, or even to choose multiple learning engines. With respect to multiple learning engines, selected algorithms can be used (rank fusion, or feature fusion) that combine the results of multiple engines, in the goal of yielding results that are in average better than the each of the engines alone.

Figure 5:
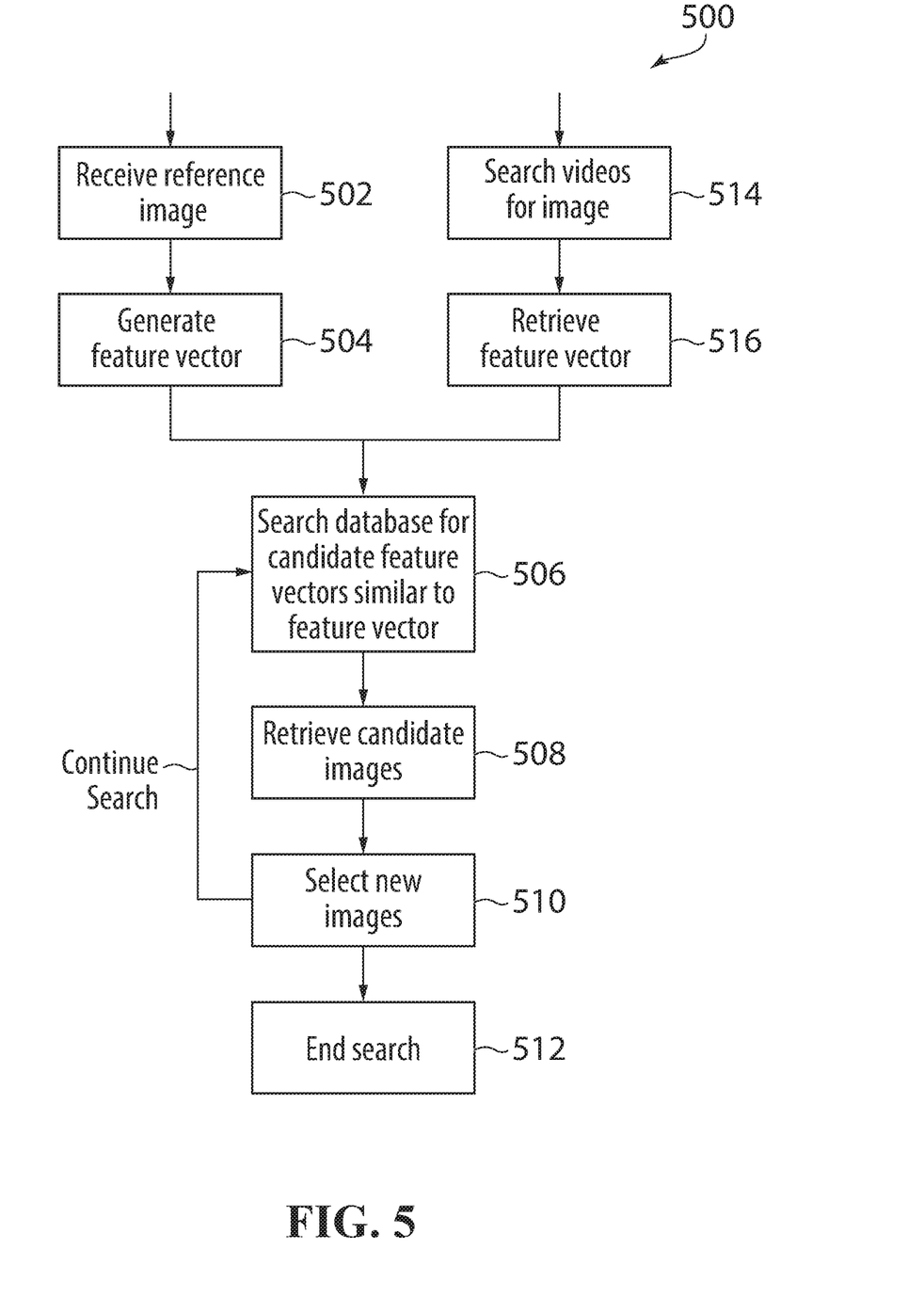
FIG. 5 shows a flow chart diagram of an example embodiment for performing appearance searching to locate recorded videos of a person or object of interest.

Referring now to FIG. 5, therein illustrated is a flow chart diagram of the example embodiment of FIG. 3 showing details of appearance search 500 for performing appearance searching at the computer terminal 104 to locate recorded videos of a reference image. To initiate an appearance search for an object of interest in a reference image, a feature vector of the reference image is needed in order to search the database 191 for similar feature vectors. In appearance search 500, there is illustrated two example methods of initiating an appearance search.

In the first method of initiating appearance search 500, a reference image of an object of interest is received 502 at the computer terminal 104 where it is sent to the Process 308 to generate 504 a feature vector of the reference image. In the second method, the user searches 514 the database 191 for a reference image of the object of interest and retrieves 516 the feature vector of the reference image which was previously generated when the video was processed for storage in the database 191.

From either the first method or the second method, a search 506 is then made of the database 191 for candidate feature vectors that exceed a threshold similarity score (or confidence level), for example 70%, when compared with the feature vector of the reference image. The images associated with the candidate feature vectors are received 508 and then presented at the computer terminal 104 via user interface 402 for the user to select 510 the images of the candidate feature vectors which are or may be of the object of interest, for example by "starring" as described above. The computer terminal 104 tracks the selected images 426 in a list. Optionally, the user at selection 510 may also remove images, which images have been selected by the user, from the list the user considers incorrect.

With selection of a new image (or images) of the object of interest at selection 510, the feature vectors of the new images may be searched 506 at the database 191 and new candidate images of the object of interest are presented at the computer terminal 104 for the user to again select 510 new images which are or may represent the object of interest. This searching loop of appearance search 500 may continue until the user decides enough images of the object of interest has been located and ends the search 512. The user may then, for example, view or export the videos associated with the images on the list.

Figure 6:
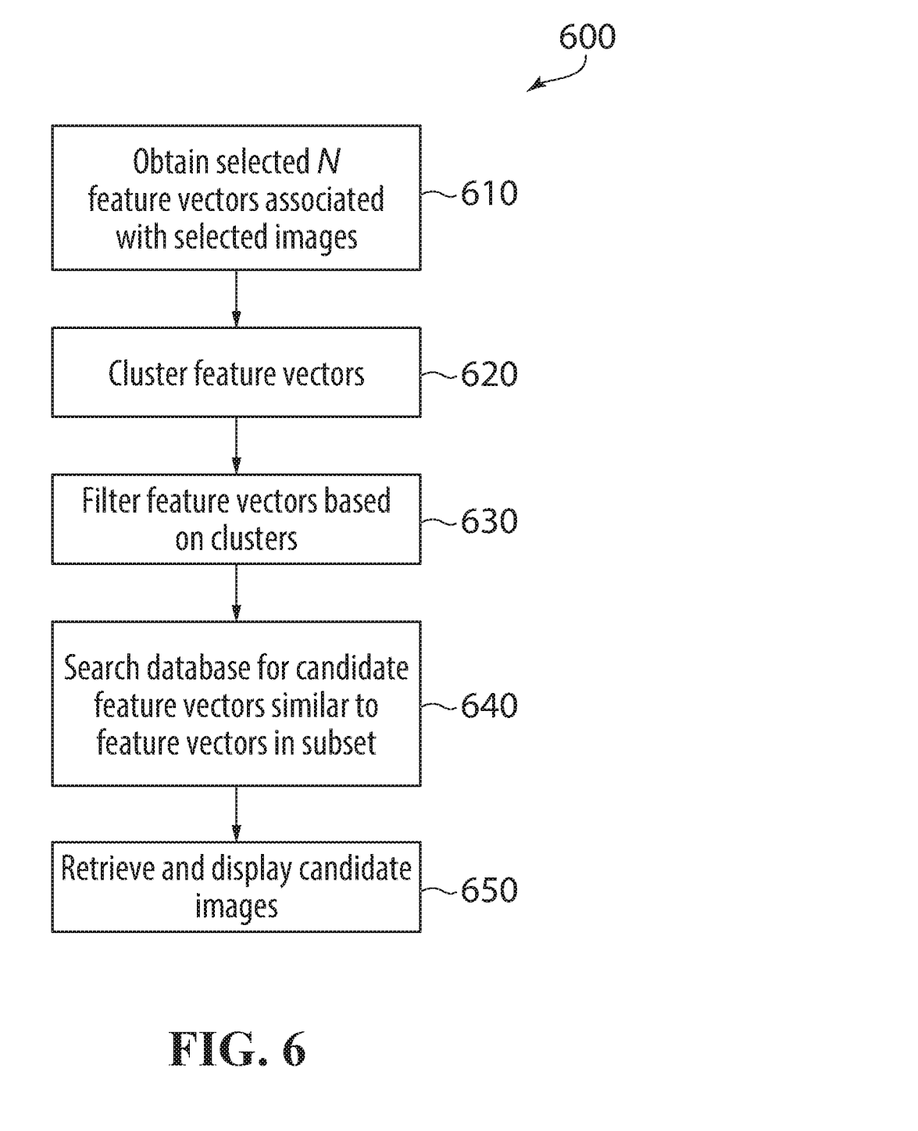
FIG. 6 shows a flow chart of an example embodiment for filtering feature vectors associated with images selected by a user for further searching.

Referring now to FIG. 6, an example embodiment of a process of conducting an appearance search 600 using user selected images 426 is set out in more detail. Conducting an appearance search 600 requires computing resources, and the initial appearance search is usually based on the selection of a single reference image. The selection of a large number of images for a further search by the user can be a drain on available computing resources. If the number of images selected by the user, N, is fewer or equal to M, M being a value for which the appearance searches would not pose a significant drain on computing resources, then the process unfolds as set out in FIG. 5. However if N>M, then the filtering process 600 as set out in FIG. 6 is followed.

Feature vectors are obtained 610 for each of the N images selected by the user, to establish a search set of N feature vectors. The search set of N feature vectors is then clustered 620, for example, using k-mediod clustering to divide the search set into a number of clusters, each cluster containing at least one feature vector, and the number of clusters being less than or equal to M. The k-mediod clustering groups the feature vectors into clusters based on similarity, i.e. similar feature vectors are grouped together. Other clustering techniques may be used, including k-means clustering, affinity propagation, and mean shift clustering.

The search set of N feature vectors is then filtered 630, for example by selection of one feature vector in each cluster. The selection of the feature vector from a cluster may be based on a criteria, for example that the selected feature vector represent an image showing the face of a person, an image showing the body of a person, the centroid of the feature vectors in the cluster, or a facet of the person, such as color of clothing or demographic information. Another criteria may be the time that has passed between the images, e.g. a more recent image may be prioritized over a less recent. In an alternative exemplary embodiment a feature vector may be generated to represent each cluster, for example an average feature vector may be determined, and the average feature vector may be distinct from the feature vectors in the cluster; alternatively a feature vector could be generated combining two feature vectors in the cluster: a feature vector representing the best image showing a face and a feature vector representing a best image showing a body.

Once the number of feature vectors have been reduced to a subset of the set of N feature vectors, the database 191 is searched 640 for candidate feature vectors similar to at least one feature vector in the subset of feature vectors, i.e. passing a threshold confidence level. Candidate images associated with the candidate feature vectors located in the search are retrieved 650 and displayed on computer terminal 104.

Figure 7:
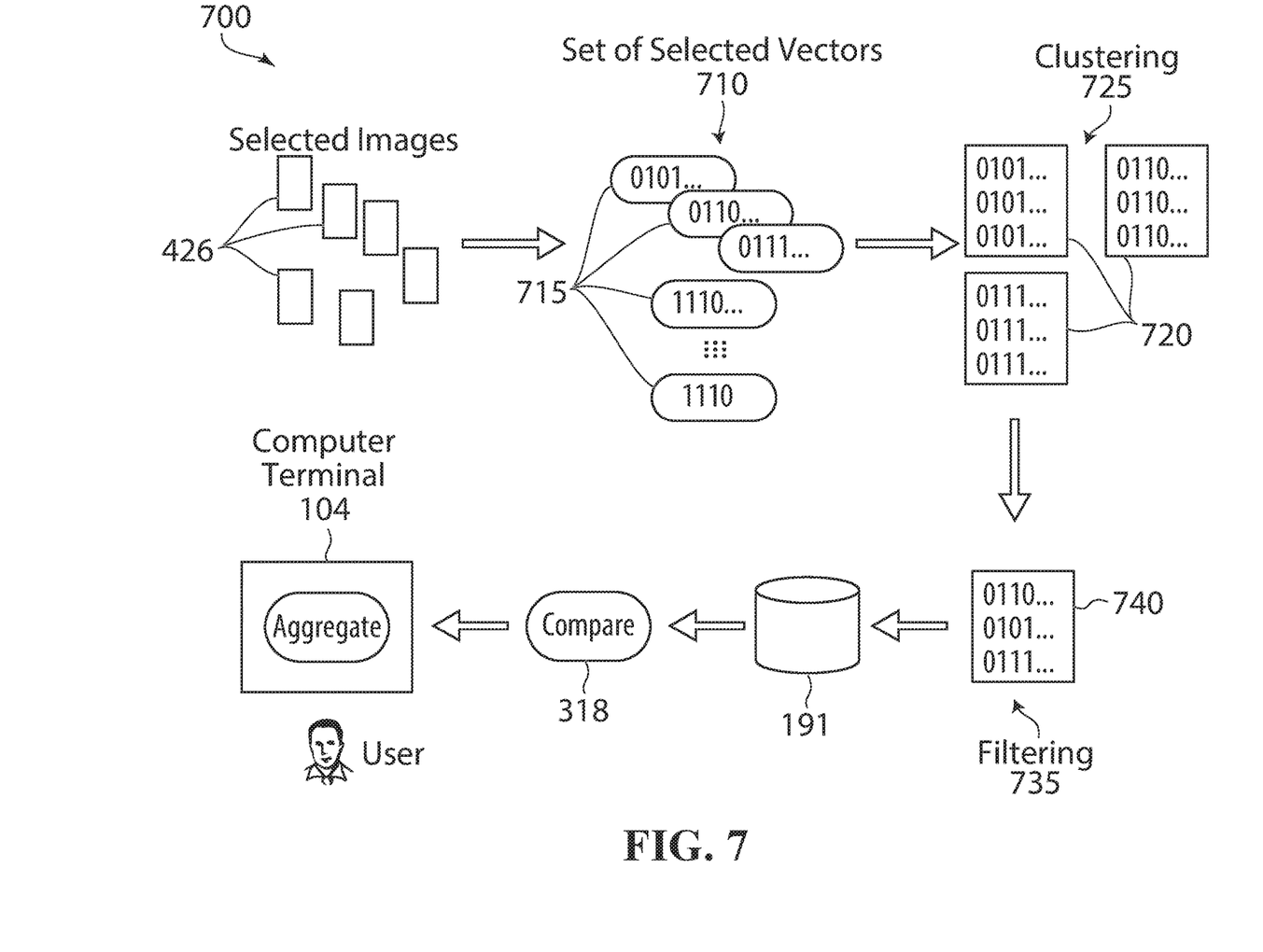
FIG. 7 shows a flow diagram of an example embodiment for filtering images selected at a computer terminal for further searching.

Referring now to FIG. 7, an example embodiment of the filtering process 700 of conducting a further appearance search 500 using user selected images 426 is set out in a flow diagram. If the number of user selected images 426, N, is >M, then the filtering process 700 is followed.

A search set 710 of N feature vectors 715 is derived by obtaining a feature vector 715 for each selected image 425. The search set of N feature vectors is then clustered 725, for example, using k-mediod clustering, to divide the search set 710 into one or more clusters 720, each cluster 720 containing at least one feature vector, and the number of clusters being less than or equal to M. The k-mediod clustering divides the feature vectors 715 into clusters 720 based on similarity, so that similar feature vectors 715 are grouped in the same cluster 720.

The search set 710 of N feature vectors is then filtered 630, for example by selection of one feature vector 715 in each cluster 720. The selection of the feature vector 715 from a cluster 720 may be based on a criteria, for example that feature vector be associated with an image showing the face of a person.

Once the number of features vectors have been reduced to a subset 740 of the set 710 of feature vectors 715, the database 191 is searched for feature vectors similar to at least one of the feature vectors 715 in the subset 740 of feature vectors. Candidate images for the similar feature vectors located in the search are retrieved, aggregated, and displayed on computer terminal 104.

Figure 8:
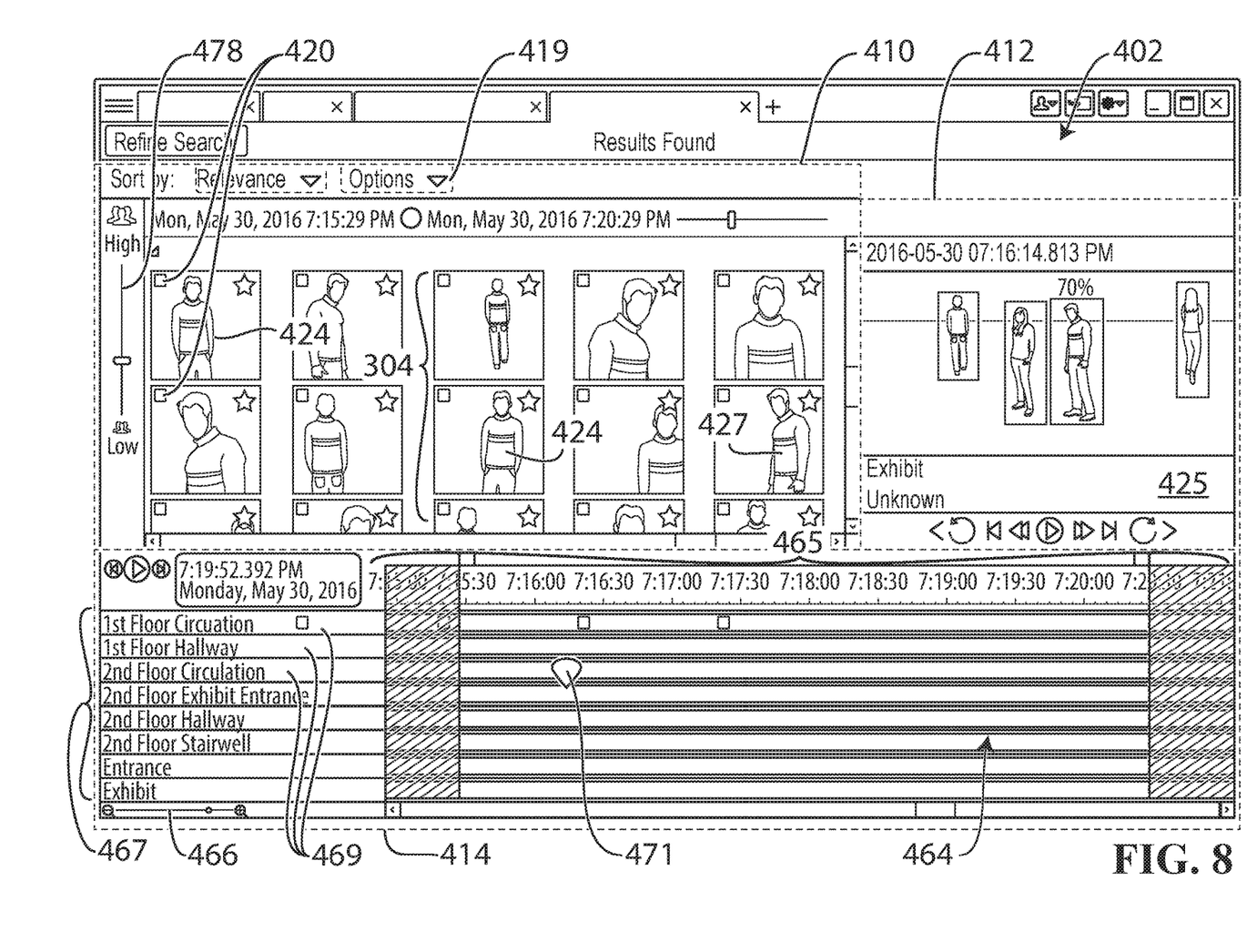
FIG. 8 shows an example embodiment of a graphical user database after displaying the results of the further search.

Referring now to FIG. 8, which shows a screen shot of an example user interface page 402, after the results of a second refined search using user selected images 426. As described with reference to FIG. 4, the user interface page 402 is divided into three functional regions: a first UI region 410, a second UI region 412 and a third UI region 414. Within the first UI region 410, slider tool 478 allows a user to set a filtering threshold based on the similarity score, or confidence level, so as to set a minimum confidence level for images which are permitted to appear on the user interface page 402. Each of the images 304 displayed on the user interface page 402 are organized into rows and columns based on the confidence level, so that those images with the greatest confidence level will appear closer to the top left of the first UI region 410 than those corresponding to lower likelihood of a match. The drop-down selector 419 is labelled "Options" and allows the computer terminal user, once clicked on, to pick other search-related options such as, for example, initiate an export of all starred results or bookmark all the selected results.

Each of the images 304 includes a square graphic 420 in the upper left corner of the thumbnail and a star graphic 424 in the upper right corner of the thumbnail. These graphics are superimposed over the images 304. The square graphic 420 can be clicked on to indicate the image is being marked for export or bookmarking. The star graphic 424 can be clicked on to select an image as indicating that the object or person of interest, or someone or something similar to the object or person of interest) is contained in the selected image 424. When this starring occurs the star graphic 424 may change from a light, translucent shading to a solid bright color (although in the illustrated example color is not shown, the star graphic on the upper left of the selected images 426 has been clicked on to indicate a match whereas the other images 304 are not).

As described above with reference to FIG. 4, a video player 425 is included in the second UI region 412 within the user interface page 402. In the illustrated example, the video player 425 is playing the portion of the video recording corresponding to image 427. In the illustrated example, bounding boxes, such as bounding boxes 429 and 431, appear around a number of moving objects and persons within the displayed video. The bounding box 431 has the percentage "70%" shown just above the top of the bounding box to indicate to the computer terminal user that the person within the bounding box 431 is calculated to have a 70% likelihood of being the person of interest.

Within the third UI region 414 is a two dimensional graph 464. The two dimensional graph 464 includes date and time along x-axis. In the illustrated example, each thirty second interval is labelled starting at 7:15 PM at the far left of the x-axis and ending at 7:21 PM at the far right of the x-axis. In at least some examples, the interval of time between the two ends of the x-axis can be increased or decreased using a slider tool 466.

As described with reference to FIG. 4, the two dimensional graph 464 also includes, along a y-axis of the graph 464, a listing 467 of a plurality of camera identifications 469 of video cameras with respect to which a respective plurality of video recordings of the video cameras are available for viewing. Each one of the plurality of camera identifications 469 corresponds to a respective one of the plurality of video cameras 198 that is located in a unique known physical location with respect to all locations of the plurality of video cameras 169 of the surveillance system 100.

Still with reference to the third UI region 414, there is a marker 471 plotted at roughly 7:16.00 PM. In this illustrated example, the marker 471 corresponds to the image 427.

After selection of one or more images by clicking on the star graphic 424, a computer terminal user can again click on the "Refine Search" button which causes system 100 to conduct a third search using the selected images 426 using the process as described above with reference to FIGS. 6 and 7. The system 100 thus can further take the user's feedback for further appearance searches.

It is contemplated that any part of any aspect or embodiment discussed in this specification can be implemented or combined with any part of any other aspect or embodiment discussed in this specification.

While the above description provides examples of the embodiments, it will be appreciated that some features and/or functions of the described embodiments are susceptible to modification without departing from the spirit and principles of operation of the described embodiments. Accordingly, what has been described above has been intended to be illustrated non-limiting and it will be understood by persons skilled in the art that other variants and modifications may be made without departing from the scope of the invention as defined in the claims appended hereto. Furthermore, any feature of any of the embodiments described herein may be suitably combined with any other feature of any of the other embodiments described herein.

Therefore, the above discussed embodiments are considered to be illustrative and not restrictive, and the invention should be construed as limited only by the appended claims.

We claim:

1. A method of processing images for a search, comprising:
   receiving a plurality of images selected from search results;
   for each image in the plurality of images, retrieving a respective feature vector associated therewith;
   selecting a subset of the feature vectors based on similarity of the feature vectors; and
   performing a search for feature vectors in a database similar to feature vectors in the subset of feature vectors, and
   wherein the plurality of images come from video captured by a camera.

2. The method of claim 1 wherein the received plurality of images are selected based on similarity to a reference image.

3. The method of claim 2 wherein the plurality of images are selected by a user.

4. The method of claim 1 wherein the plurality of images were generated from a search for images similar to a reference image.

5. The method of claim 1 wherein selecting the subset of feature vectors comprises clustering the feature vectors associated with the images into a plurality of clusters.

6. The method of claim 5 wherein selecting the subset of images comprises filtering the feature vectors based on the clustering.

7. The method of claim 6 wherein the clustering is k-mediod clustering.

8. The method of claim 7 wherein the filtering is selecting a feature vector from each of the clusters.

9. The method of claim 8 wherein selecting a feature vector from each of the clusters comprises selecting a feature vector in a cluster associated with an image showing the face of a person.

10. The method of claim 1 wherein the number of images in the plurality of images exceeds a threshold.

11. The method of claim 10 wherein the number of feature vectors in the subset of feature vectors does not exceed the threshold.

12. The method of claim 1 further comprising displaying the images associated with the feature vectors located in the search.

13. A method of processing images for a search, comprising:
    conducting a search for images similar to a reference image;
    receiving a plurality of images selected from search results;
    for each image in the plurality of images, retrieving a respective feature vector associated therewith;
    selecting a subset of the feature vectors based on similarity of the feature vectors;
    locating feature vectors in a database similar to feature vectors in the subset of feature vectors; and
    displaying images associated with the located feature vectors.

14. The method of claim 13 wherein selecting the subset of feature vectors comprises clustering the feature vectors associated with the images into a plurality of clusters.

15. The method of claim 14 wherein selecting the subset of images comprises filtering the feature vectors based on the clustering.

16. The method of claim 15 wherein the clustering is k-mediod clustering.

17. The method of claim 16 wherein the filtering is selecting a feature vector from each of the clusters.

18. The method of claim 17 wherein selecting a feature vector from each of the clusters comprises selecting a feature vector in a cluster associated with an image showing the face of a person.

19. The method of claim 13 wherein the number of images in the plurality of images exceeds a threshold.

* * * * *